United States Patent [19]

Anderson et al.

[11] Patent Number: 5,530,659
[45] Date of Patent: Jun. 25, 1996

[54] METHOD AND APPARATUS FOR DECODING INFORMATION WITHIN A PROCESSING DEVICE

[75] Inventors: Donald C. Anderson; Peter C. Curtis; Gregg S. Kodra, all of Austin, Tex.

[73] Assignee: Motorola Inc., Schaumburg, Ill.

[21] Appl. No.: 297,479

[22] Filed: Aug. 29, 1994

[51] Int. Cl.⁶ .......................... G06F 7/00; H03K 19/094
[52] U.S. Cl. ................... 364/715.04; 364/715.1; 326/95; 326/106
[58] Field of Search .................. 364/715.04, 715.1; 326/95–98, 34, 105–108

[56] References Cited

U.S. PATENT DOCUMENTS

| | | | |
|---|---|---|---|
| 3,599,180 | 8/1971 | Rubinstein et al. | 365/150 |
| 3,778,782 | 11/1973 | Kitagawa | 326/95 X |
| 4,087,044 | 5/1978 | Hofmann | 326/97 X |
| 4,827,160 | 5/1989 | Okano | 326/34 |
| 4,851,716 | 7/1989 | Needles et al. | 326/108 |

*Primary Examiner*—Roy N. Envall, Jr.
*Assistant Examiner*—Chuong D. Ngo

[57] ABSTRACT

In a decoding apparatus (100), overflow conditions can be determined within the same clock cycle by determining the type of operation to be performed. For time sensitive operations, a load (102) and a discharge device (105) are temporarily coupled to a dynamic decoding structure (101) of the decoding apparatus (100). The load (102) and the discharge device (105) allow the decoding apparatus (100) to stabilize within a first clock phase (114) of a clock cycle. Thus, the second phase (113) of the clock cycle can be used to determine whether an overflow condition has occurred. For non-time sensitive operations, a precharge device (104) and the discharge device (105) are operably coupled to the dynamic decoding structure (101), while the load (102) is disabled.

12 Claims, 5 Drawing Sheets

METHOD AND APPARATUS FOR DECODING INFORMATION WITHIN A PROCESSING DEVICE

TECHNICAL FIELD OF THE INVENTION

This invention relates generally to processing devices, and, in particular, to a method and apparatus that improves execution cycle time and reduces power consumption in such processing devices.

BACKGROUND OF THE INVENTION

Processing devices such as digital signal processors, microprocessors, microcomputers, and micro-controllers include a plurality of elements such as memory, arithmetic logic unit (ALU), a clock, interrupt processing elements, and data buses that couple these elements together. The ALU performs arithmetic functions for the processing device. In particular, the ALU can perform addition, subtraction, multiplication, and logical operations such as AND, OR, NAND, etc. A typical ALU includes a clock reference, which is synchronized to the clock of the processing device, a control generation unit, control logic, a priority encoder, a shifting element, and an operand element. For most arithmetic functions, with the exclusion of a shift-left command, the primary encoder provides the arithmetic resultant for a particular set of opcode. While the arithmetic function is being executed, the ALU checks for overflow conditions. As is known, an overflow condition arises when the arithmetic resultant exceeds the bit size of a resultant register.

For arithmetic shift-left functions, the shifting element shifts the numerical resultant, or operand, by a predetermined shift amount. When the predetermined shift amount requires at least one bit of significance of the operand to be lost (i.e., shifted out), an overflow condition arises. To detect this overflow condition with prior art techniques, the output of the priority encoder (i.e., the numerical resultant) takes a full clock phase to become stable. This occurs because the priority encoder samples an input by first enabling a precharge device during the first clock phase of a clock cycle and then enabling a discharge device during a second clock phase of the clock cycle.

During the second clock phase, an overflow is sensed by an adder, which sends the overflow condition to the control generation unit. The control generation unit provides an overflow signal to a saturation register, which routes a saturation value to memory. It takes at least one clock phase to process the overflow condition and store the saturation information in the memory. Typically, it takes more than one clock phase to execute these steps due to parasitics within a processing device, which is implemented on an integrated circuit. Because of this, a user of the processing device must wait at least one additional clock cycle to use the resultant of the arithmetic shift-left function, thus adding unnecessary processing steps.

In some applications, the arithmetic shift-left operation is rarely used. Thus, waiting an extra clock cycle every so often does not greatly affect the overall execution time of the processing device. In other applications, the shift-left operation is used extensively, producing substantial delays in execution time. One such application is audio compression algorithms used in communication equipment. In audio compression algorithms, the shift-left operation is used extensively. By having to wait an extra clock cycle each time the shift-left operation is used, the audio compression capabilities are limited. For example, an audio compression algorithm that digitizes audio in to a 4.8 Kbit stream has more execution steps, and thus requires more execution time, than an audio compression algorithm that digitizes audio in to a 64 Kbit stream. In addition to adding extra execution time, which in the high audio compression algorithms cannot be afforded, waiting an extra clock cycle consumes additional power.

One solution to overcoming the arithmetic shift-left delay is to continuously load the output of the priority encoder such that the output can become stabilized within the first-clock phase and the overflow condition can begin in the first clock phase and be completed during the second clock phase, thus the overflow condition will be usable in the next clock cycle. While this technique eliminates the one clock cycle wait problem, it requires a substantial amount of current to maintain the load. For example, if the load is a self-biased sensed amplifier, 0.5 to 1.0 mA/bit is consumed. This is an impractical solution for battery operated communication devices.

Therefore, a need exists for a method and apparatus that eliminates the one clock cycle wait problem for overflow determinations and minimizing power consumption.

DETAILED DESCRIPTION OF A PREFERRED EMBODIMENT

Generally, the present invention provides a method and apparatus for detecting overflow conditions within one clock cycle. To achieve this, a decoding apparatus, which includes a dynamic decoder structure, is coupled to a precharge device, a discharge device, and a load. When the decoding apparatus is being utilized for a time sensitive operation, the discharged device and the load are enabled while the precharge device is disabled. Conversely, when the decoding apparatus is used for a non-time sensitive operation, the load is disabled while the precharge device and discharge device are operably enabled. With such a method and apparatus, the present invention provides same clock cycle determination of an overflow condition for time sensitive operations while minimizing power consumption requirements in comparison to prior art solutions.

Figure 1:
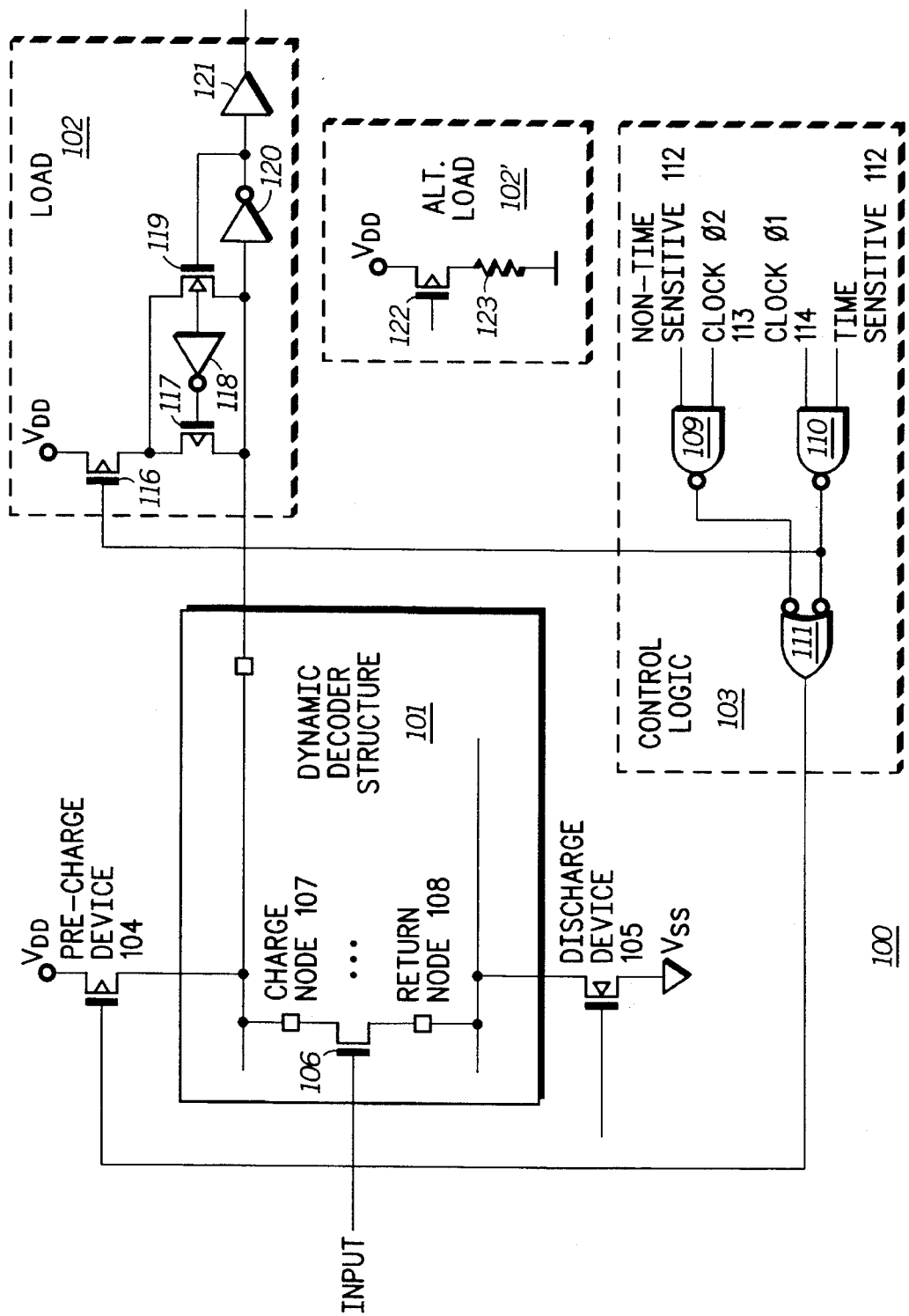
FIG. 1 illustrates a schematic block diagram of a decoding apparatus in accordance with the present invention.

The present invention can be more fully described with reference to FIGS. 1–5. FIG. 1 illustrates a decoding apparatus 100 that includes a dynamic decoder structure 101, a load 102, control logic 103, a precharge device 104, and a discharge device 105. The decoding apparatus 100 may be a priority encoder or a portion thereof. Within the decoding apparatus 100, the dynamic decoding structure, or dynamic decoder 101, which may be a read-only memory, a programable logic array, or a tree-decoder, includes at least one switching element 106. Depending on the type of dynamic decoder structure 101, the switching element 106 may be an n-channel transistor, a p-channel transistor, or any other type of transistor that has a charge node 107 and a return node 108.

As is shown, the dynamic decoder structure 101 is coupled to a precharge device 104 and a discharge device 105. The types of precharge device 104 and discharge device 105 depend upon the dynamic decoding structure type. For example, if the dynamic decoding structure 101 is comprises of a plurality of n-channel transistors, the precharge device 104 is a p-channel transistor while the discharge device 105 is an n-channel transistor. In this configuration, the precharge device 104 and the discharge device 105 are operably coupled to the dynamic decoder 101 based on the gate signal provided by the control logic 103. When the gate signal is high, the discharge device 105 is enabled, while the precharge device 104 is disabled. Conversely, when the gate signal is low, the precharge device 104 is enabled, while the discharge device 105 is disabled. As an alternative example, if the dynamic decoder 101 is comprises of p-channel transistors 106, the precharge device 104 would be an n-channel transistor while the discharge device 105 would be a p-channel transistor. With such an embodiment, operable coupling of the precharge device 104 and the discharge device 105 would again be controlled by the gate signal produced by the control logic 103, however, in this configuration, the polarity of the signal would be reversed.

The load 102 is shown as a self-biasing sensing amplifier that includes p-channel transistors 116, 117, an n-channel transistor 119, inverters 118 and 120 and a buffer 121. The operation of the self-biasing sensing amplifier is well known thus no further description will be presented. As is also shown, an alternate load 102' includes a p-channel transistor operably coupled in series to a resistive load 123. Whether the load is the gateable DC load 102' or the self-biasing sensing amplifier 102, the load is enabled or disabled by a signal produced by the control logic 103.

The control logic 103 includes logic gates that provide a precharge disable signal and a load/discharge enable signal when the clock cycle is in Ø1 and the present operational instruction is time sensitive. The control logic 103 also provides a load disable signal and precharge/discharge enable signal when the clock cycle is in Ø2 and the present operational instruction is non-time sensitive. While a plurality of logic gate combinations may be used to implement the control logic 103, the one illustrated comprises three NAND-gates 109–111. The control logic 103 as shown has, for non-time sensitive operations, the non-time sensitive and Ø1 inputs high and the time sensitive and Ø2 inputs low during Ø1. During Ø2, the non-time sensitive and Ø2 inputs are high, while the time sensitive and Ø1 inputs are low. Thus, during Ø1, the precharge device 104 is enabled, while the discharge device 105 and the load 102 are disabled. During Ø2, the discharge device 105 is enabled, while the precharge device 104 and the load 102 are disabled. For time sensitive operational codes, the inputs will be the same except that the time sensitive will be high instead of the non-time sensitive input. Thus, during Ø1, the load and the discharge device 105 are enabled, while the precharge device 104 is disabled. During Ø2, the load 102 and the discharge device 105 will be disabled. Thus, the high current load 102 is only enabled for one clock phase for time sensitive operational codes, or operations, such as a shift-left operation.

Figure 2:
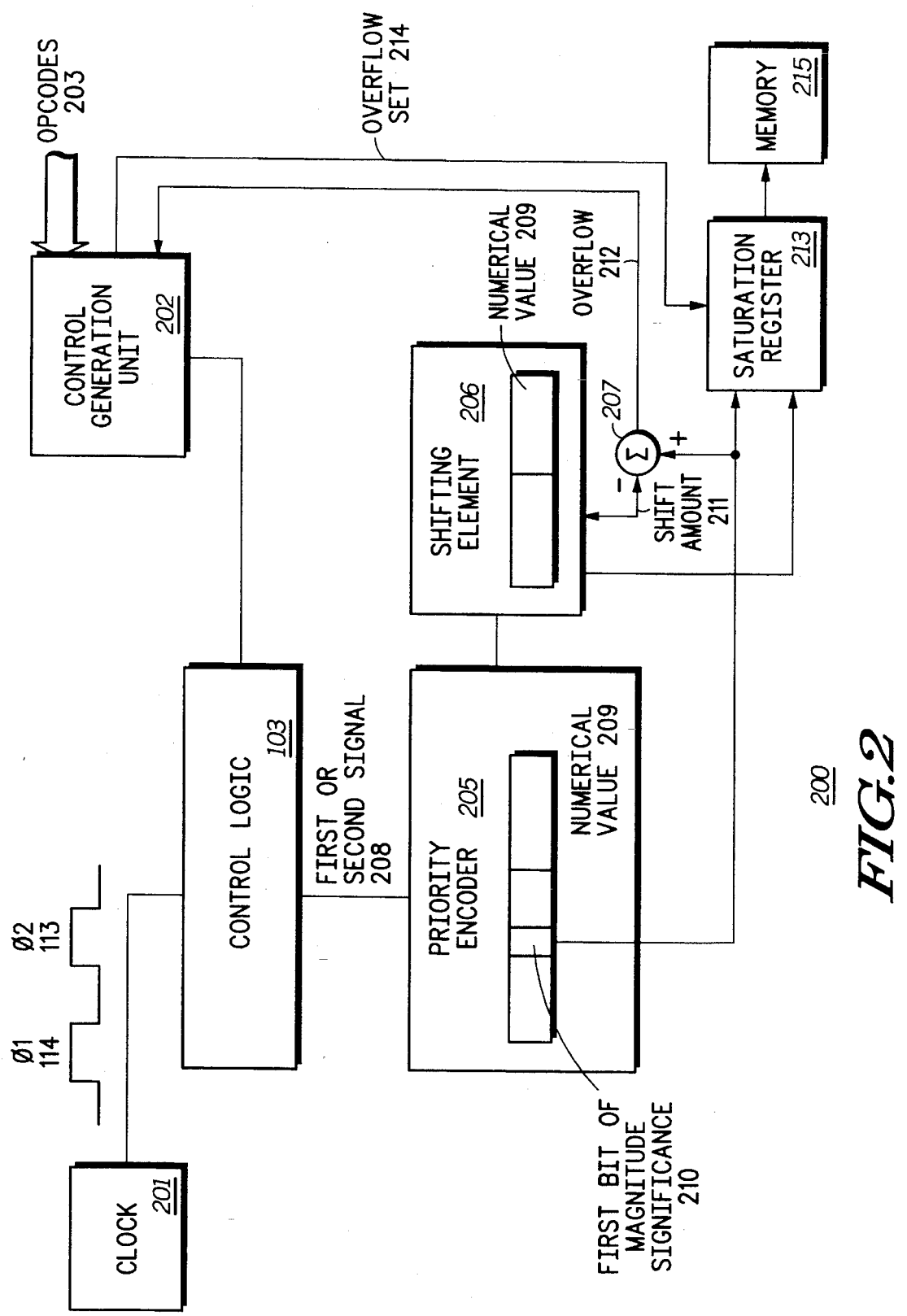
FIG. 2 illustrates a schematic block diagram of an execution unit in accordance with the present invention.

FIG. 2 illustrates a portion of an arithmetic logic unit (ALU) which may be incorporated into a processing device, such as a microprocessor, microcomputer, microcontroller, or digital signal processor. As shown, the ALU, or execution unit 200 includes a clock 201, a control generation unit 202, operational codes, or operations, 203, control logic 103, a priority encoder 205, a shifting element 206, an operand element 207, a saturation register 213, and memory 215. The clock 201 produces a repetitive clock cycle which includes clock phase one (Ø1) 114 and clock phase two (Ø2) 113 and provides the clock cycle to the control logic 204. The control generation unit 202 receives the operational codes 203 and determines whether the op-codes are either time sensitive op-codes or non-time sensitive op-codes. This determination, may be done by an internal table look-up, reading a bit within the op-code, or any other type of flagging means.

In practice, time sensitive operations will be any opcode that, during its execution, requires no more than one clock cycle to execute. For example, such an opcode may be an arithmetic shift-left operation. Having determined the time sensitivity of the incoming opcode, the control generation unit 202 provides time sensitive and non-time sensitive inputs to the control logic 103. For the control logic 103, as shown in FIG. 1, the time sensitivity signals provided by the control generation unit 202 would be: for the time sensitive input, a "0" for non-time sensitive operations; a "1" for time sensitive operations; and for the non-time sensitive input, a "0" for time sensitive operations, and a "1" for non-time sensitive operations. Having received these inputs, the control logic 103 would produce a first signal for time sensitive operations and a second signal for non-time sensitive operations as discussed above.

The priority encoder 205, which incorporates the decoding apparatus 100, determines whether it has received the first signal or the second signal 208 from the control logic 103. When the priority encoder 205 has received the first signal 208, it determines a first bit of magnitude significance 210 for a numerical value 209, wherein the numerical value 209, or stored information, is produced by the priority encoder 205 based on a time sensitive op-code 203. The first bit of magnitude significance 210, for a positive binary number, is the first occurrence of a "1" going from the most significant to the least significant bit. Thus, for an eight bit numerical value 209, of 00011001, the first bit of magnitude significance is 3, wherein the numbering starts at zero. Conversely, if the numerical value 209 is a negative number, the first bit of magnitude significance 210 indicates the bit position of the first zero.

In addition to determining the first bit of magnitude significance, the control logic 103 enables the load 102 and the discharge device 105 during Ø1 of the clock cycle. By doing this, the numerical value 209 becomes stable within Ø1 such that subsequent overflow operations, such as the subtraction, can occur within Ø1.

Assuming that the time sensitive op-code is a shift-left operation, the shift amount 211 is subtracted from the first bit of magnitude significance to determine an overflow condition 212. This subtraction occurs within the operand 207, which may be an adder having its inputs arranged to perform a subtraction. If the shift amount exceeds the first bit of magnitude significance, an overflow condition would exist, which is determined within Ø1.

When an overflow condition 212 occurs, a signal is sent to the control generation 202 which in turn provides, during Ø2, a saturation high bit or a saturation low bit to the saturation register 213. When either of these two bits are set, a predetermined saturation output is sent to memory 215 and is stored therein. The predetermined saturation value is typically either the maximum positive value that can be represented within the given word length or the maximum negative value within the given word length.

When an overflow condition 212 does not occur, i.e., the shift amount is less than the first bit of magnitude significance, the control unit does not enable the saturation high or saturation low bits thus the saturation register 213 receives the shifted numerical value and supplies that to memory 215 which is stored therein.

Figure 3:
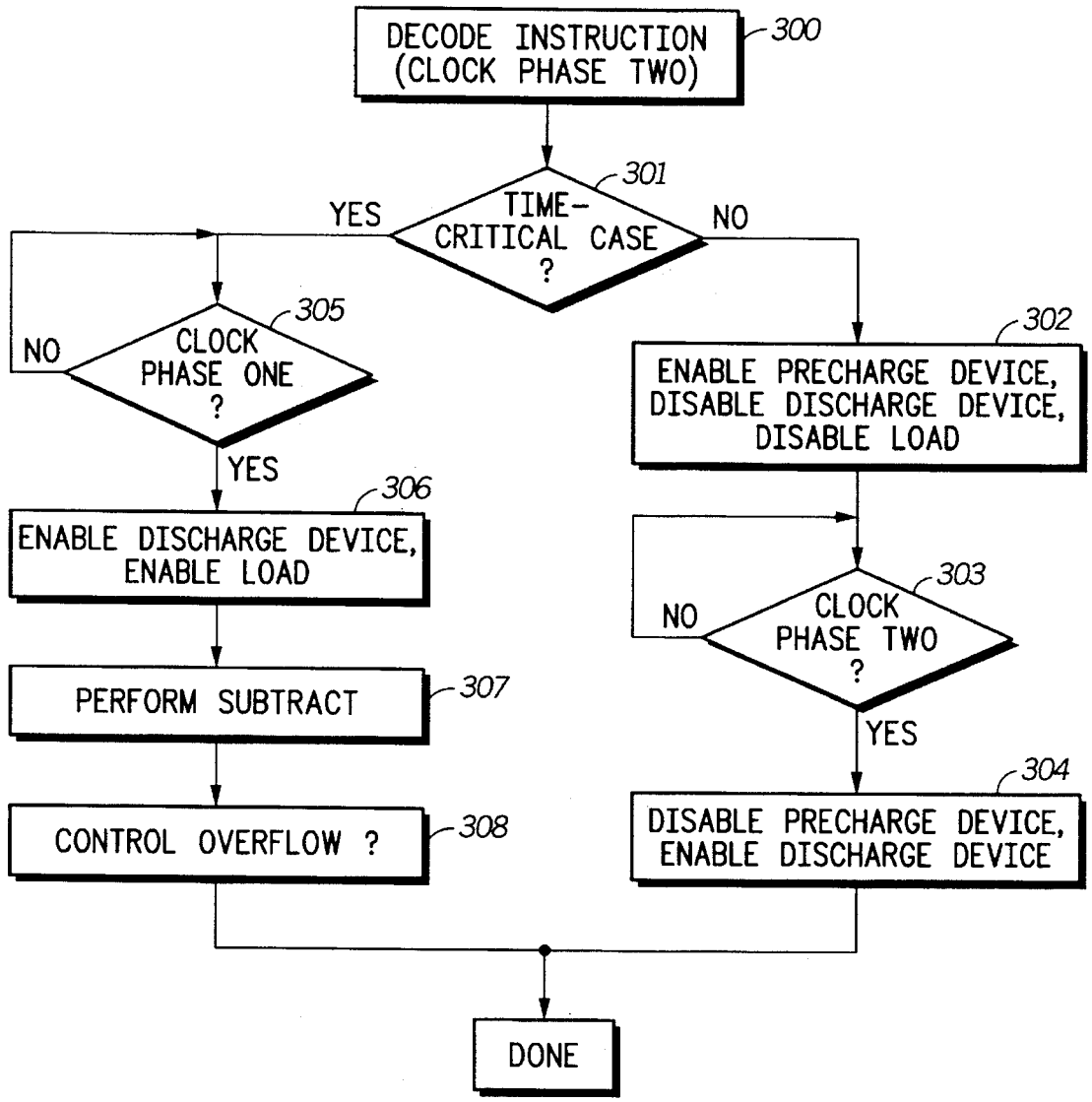
FIG. 3 illustrates a logic diagram that may be used to implement the present invention.

FIG. 3 illustrates a logic diagram that may be used to implement the present invention. At step 300, an instruction, or operation, is decoded during Ø2 of a preceding clock cycle to determine whether the operational instruction is a time-sensitive or non-time-sensitive instruction 301. For a non-time-sensitive operational instruction, the precharge device is enabled while the discharge device and the load are disabled during Ø1 of the present clock cycle 302. Having done this, the process waits until the present clock cycle is in Ø2 303. Upon reaching the second clock phase, the precharge device is disabled while the discharge device is enabled 304. This branch of the logic diagram provides a typical precharge/discharge function, or operational coupling, of the precharge device and discharge device to a dynamic decoding structure.

If, on the other hand, the operations code is a time-sensitive operation 301, the process waits until the clock cycle is in the Ø1 305. When the clock cycle is in the first clock phase, the discharge device and the load are enabled 306. With the load and discharge device enabled, a subtraction of the predetermined shift amount and the first bit of magnitude significance is performed 307. Having done the subtraction 307, the process determines whether an overflow condition has occurred 308. When an overflow condition is determined, the saturation register provides a saturation value to memory. Conversely, when an overflow condition does not exist, the saturation register provides the resultant of the operation to memory.

Figure 4:
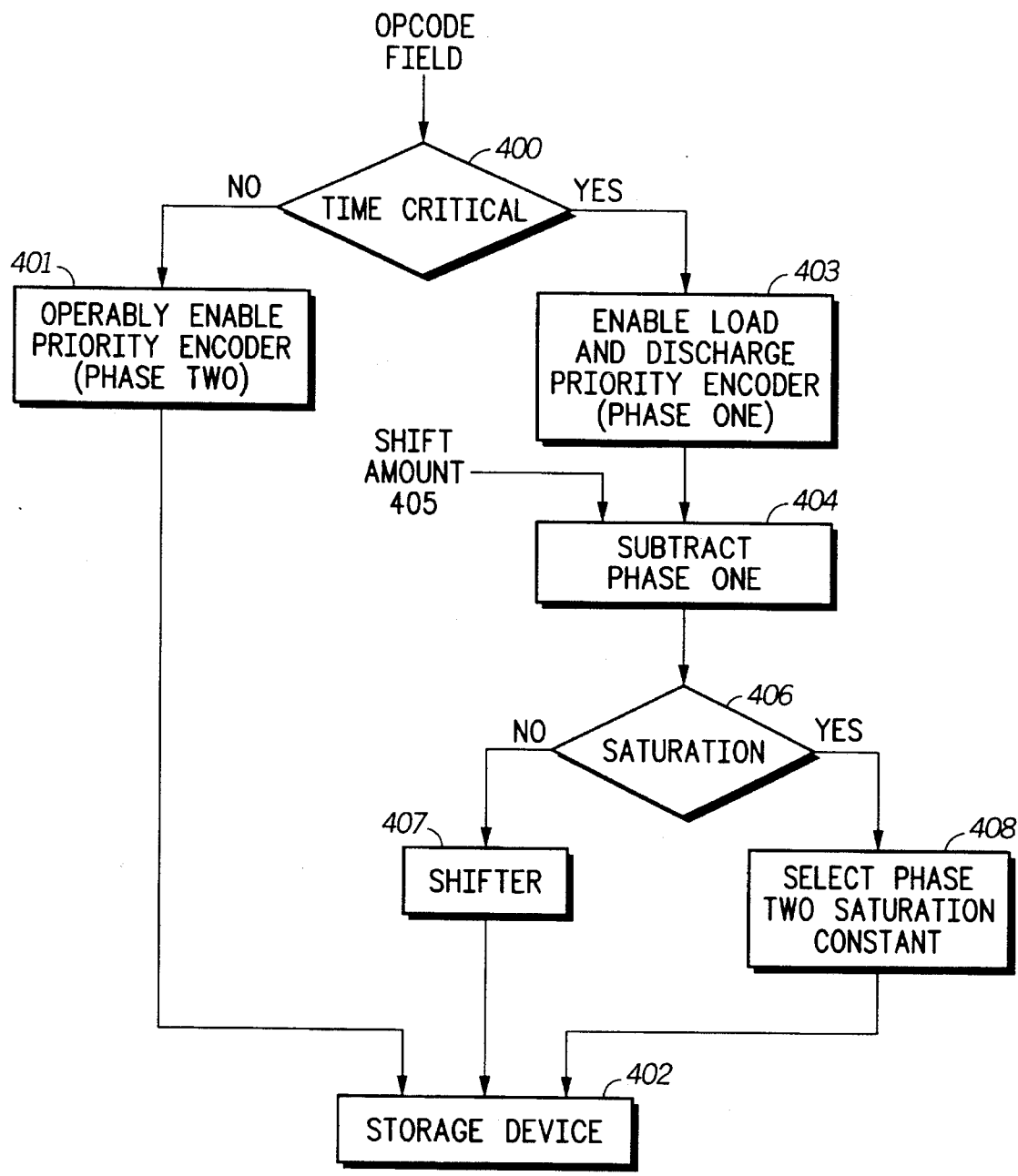
FIG. 4 illustrates a logic diagram that may be used to implement an alternate embodiment of the present invention.

FIG. 4 illustrates a logic diagram that may be used to implement a more specific implementation of the present invention. At step 400, upon receiving an opcode field, it is determined whether it is a time-sensitive or non-time-sensitive operational instruction. For a non-time-sensitive operational instruction, the priority encoder is enabled during phase two and executes the operational instruction 401. Having done this, the resultant is stored in a storage device, or memory, 402.

If the operational code is of a time-sensitive nature 400, the load and discharge device are enabled during phase one of the clock cycle 403. While the load and discharge device are enabled during phase one, a subtraction is performed between the shift amount 405 and the first bit of magnitude significance 404. Having done the subtraction, the process determines whether a saturation, or an overflow condition has occurred 406. If an overflow or saturation condition 406 has not occurred, the output of the shifting element 407 is stored within the storage device 402. If, however, an overflow or saturation condition, has occurred., the selected saturation constant 408 is routed to the storage device 402.

Figure 5:
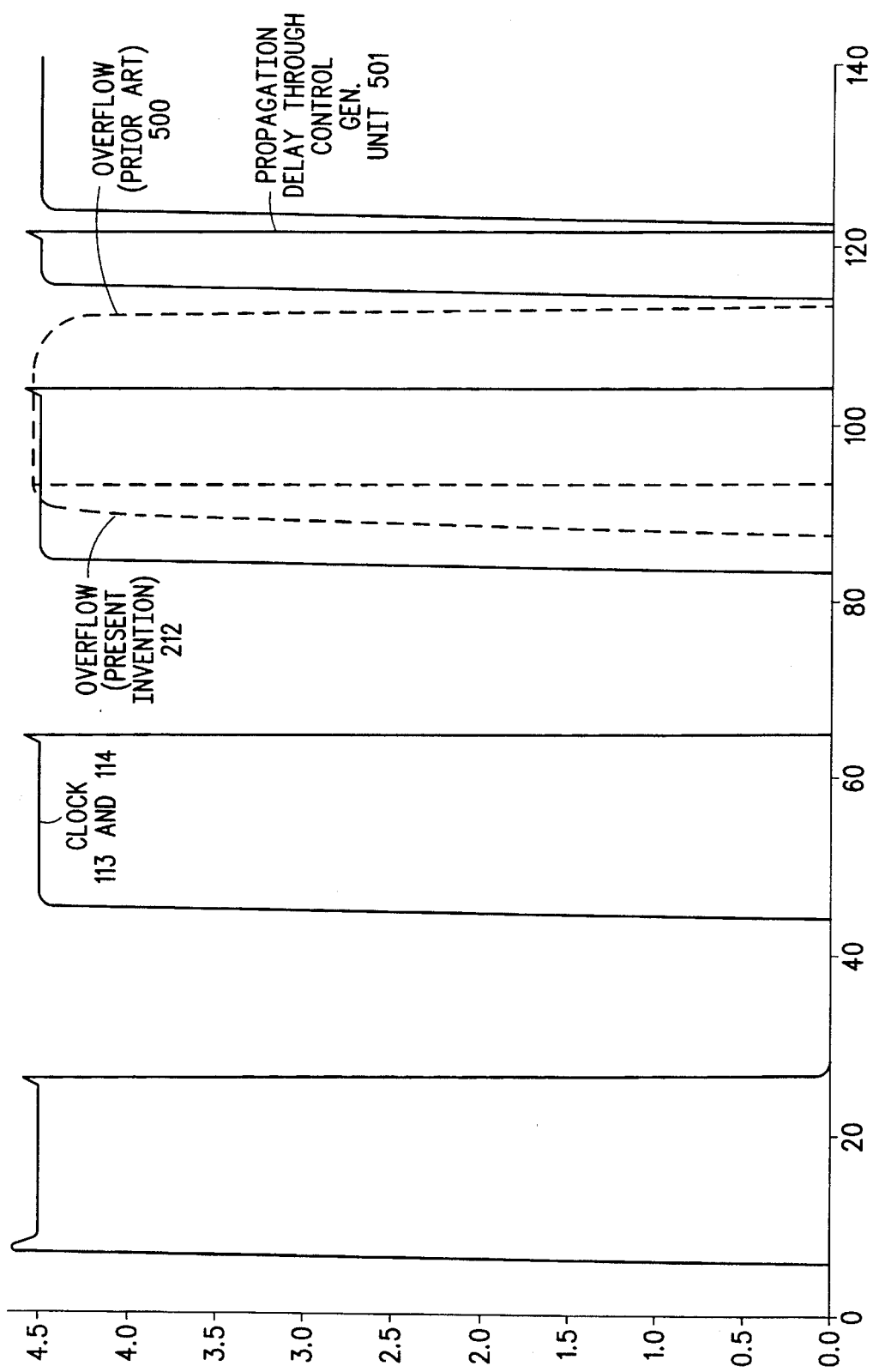
FIG. 5 illustrates a timing diagram that compares the resultant of the present invention with prior art results.

FIG. 5 illustrates a timing diagram which compares the results of the present invention with the results of prior art techniques. As shown, the figure includes the phase one and phase two of the clock cycle 113 and 114. The figure also illustrates the propagation delay through the control generation unit 501, the overflow signal of the present invention 212, and the overflow signal of the prior art 500. The propagation delay 501 is a fixed amount of time and it does not commence until the falling edge of the overflow signal 500 or 212. In the prior art situation, the falling edge of the overflow signal does not occur until almost half way through Ø2. Adding the propagation delay 501 at the trailing edge of the overflow signal 500, the propagation delay 501 has a trailing edge near the rising edge of Ø1 of the next clock cycle. Because of this close proximity, a reliable result cannot be achieved before Ø1 of the next clock cycle begins, thus, the programmer must wait one clock cycle to use the results.

In contrast, the overflow signal of the present invention 212 has a falling edge well within Ø1 of the current clock cycle. Thus, by adding the propagation delay 501 on to the falling edge of the overflow signal 212, the propagation delay 501 falling edge occurs well before Ø1 of the next clock cycle. Thus results of the current operation are usable during the next clock cycle, which eliminates the one clock cycle wait problem.

The present invention provides a method and apparatus for detecting an overflow condition within the same clock cycle for time sensitive operations. With such a method and apparatus, the one clock cycle wait requirement of prior art processing devices is eliminated. And, unlike a continuous loading technique of the prior art, the present invention consumes considerably less power. The power consumption is reduced because the load is only enabled for time sensitive operations, such as a shift left operation.

We claim:

1. A decoding apparatus comprising:
   a dynamic decoder structure that includes at least one switching element;
   a precharge device that is operably coupled to a charge node of the at least one switching element;
   a discharge device that is operably coupled to a return node of the at least one switching element;
   a load that is operably coupled to the charge node of the at least one switching element; and
   control logic that enables the load and the discharge device while disabling the precharge device during time sensitive operations and, during non-time sensitive operations, operably enabling the precharge device and the discharge device while disabling the load.

2. The decoding apparatus of claim 1, wherein the dynamic decoder structure comprises a read only memory.

3. The decoding apparatus of claim 1, wherein the dynamic decoder structure comprises a programmable logic array.

4. The decoding apparatus of claim 1, wherein the dynamic decoder structure comprises a tree decoder.

5. The decoding apparatus of claim 1, wherein the load comprises a self bias sense amplifier.

6. The decoding apparatus of claim 1, wherein the load comprises a gateable DC load.

7. An execution unit comprising:
   a clock generator that produces a clock signal, which includes, in time sequence, a first clock phase and a second clock phase;
   a control generation unit that provides time sensitive operations and non-time sensitive operations;
   a control logic operably coupled to the control generation unit and the clock generator, wherein the control logic provides a first signal for the time sensitive operations and a second signal for the non-time sensitive operations;
   a priority encoder that is operably coupled to the control logic, wherein the priority encoder provides an indication of a first bit of magnitude significance of a numerical value, wherein the priority encoder is enabled during the first clock phase when the control logic generates the first signal, and, when the control logic generates the second signal, the priority encoder is disabled during the first clock phase and enabled during the second clock phase;

a shifting element that provides a parallel shift of the numerical value by a predetermined shift amount; and an operand element that provides an overflow indication of the numerical value based on the predetermined shift amount and the indication of a first bit of magnitude significance when the control logic produces the first signal.

8. The execution unit of claim 7, wherein the priority encoder comprises:

a dynamic decoder structure that includes at least one switching element;

a precharge device that is operably coupled to a charge node of the at least one switching element;

a discharge device that is operably coupled to a return node of the at least one switching element;

a load that is operably coupled to the charge node of the at least one switching element; and control logic that enables the load and the discharge device while disabling the precharge device during time sensitive operations and, during non-time sensitive operations, operably enabling the precharge device and the discharge device while disabling the load.

9. The execution unit of claim 7, wherein the operand element comprises an adder that subtracts the predetermined shift amount from the indication of the first bit of magnitude significance.

10. A method for decoding information, the method comprising the steps of:

a) writing information in to a dynamic decoder to produce stored information;

b) determining whether the stored information will be utilized in a time sensitive operation or a non-time sensitive operation;

c) when the stored information is used for the time sensitive operation, coupling a load and a discharge device to the dynamic decoder and disabling a precharge device from the dynamic decoder; and d) when the stored information is used the non-time sensitive operation, coupling the discharge device and the precharge device to the dynamic decoder while disabling the load.

11. A method for executing an operation on dynamically stored information, the method comprising the steps of:

a) writing information in to a dynamic decoder during a first clock phase to produce stored information;

b) determining a shift amount of the stored information;

c) determining whether the stored information will be utilized in a time sensitive operation or a non-time sensitive operation;

d) when the stored information is used for the time sensitive operation, determining a first bit of magnitude significance of the stored information during the first clock phase; and e) when the stored information is used for the time sensitive operation, determining whether an overflow exists based on the shift amount and the first bit of magnitude significance.

12. The method of claim 11 further comprises:

d) when the stored information is used for the non-time sensitive operation, reading the stored information during a second clock phase, wherein the second clock phase follows, in time, the first clock phase.

* * * * *